United States Patent
Arai (10) Patent No.: US 7,937,119 B2
(45) Date of Patent: May 3, 2011

(54) MOBILE TERMINAL WITH TV AND RADIO AND POWER CONSERVATION

(75) Inventor: Masae Arai, Hachioji (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 1077 days.

(21) Appl. No.: 11/497,729

(22) Filed: Aug. 2, 2006

(65) Prior Publication Data

US 2007/0243850 A1 Oct. 18, 2007

(30) Foreign Application Priority Data

Apr. 17, 2006 (JP) ................................. 2006-113647

(51) Int. Cl.
*H04M 1/00* (2006.01)
(52) U.S. Cl. ... 455/574; 455/3.01; 455/3.06; 455/343.1; 455/343.3; 455/343.6
(58) Field of Classification Search ........ 455/3.01–3.06, 455/550.1, 556.1, 572–574, 343.1–343.6
See application file for complete search history.

(56) References Cited

U.S. PATENT DOCUMENTS

| | | | |
|---|---|---|---|
| 6,741,293 B1 * | 5/2004 | Obuchi | 348/554 |
| 7,305,569 B2 * | 12/2007 | Reilly | 713/300 |
| 7,317,495 B2 * | 1/2008 | Takahashi | 348/838 |
| 7,336,976 B2 | 2/2008 | Ito | |
| 7,343,141 B2 * | 3/2008 | Ellis et al. | 455/132 |
| 7,539,518 B2 * | 5/2009 | Kanno | 455/574 |
| 2001/0029196 A1 * | 10/2001 | Wakamatsu | 455/574 |
| 2004/0266335 A1 | 12/2004 | Usui et al. | |
| 2006/0121886 A1 * | 6/2006 | Maehara et al. | 455/412.1 |
| 2006/0166708 A1 * | 7/2006 | Kim et al. | 455/573 |
| 2007/0238427 A1 * | 10/2007 | Kraft et al. | 455/184.1 |
| 2007/0249395 A1 * | 10/2007 | Kondo et al. | 455/556.1 |
| 2007/0254696 A1 | 11/2007 | Kajitani | |

FOREIGN PATENT DOCUMENTS

| | | |
|---|---|---|
| JP | 2004-274095 A | 9/2004 |
| JP | 2005-94273 A | 4/2005 |
| JP | 2005-109616 A | 4/2005 |
| JP | 2005-143144 A | 6/2005 |
| JP | 2005-151117 A | 6/2005 |
| JP | 2005-333591 A | 12/2005 |

OTHER PUBLICATIONS

Japanese Office Action (and English translation thereof) dated Feb. 19, 2008, issued in a counterpart Japanese Application.

\* cited by examiner

*Primary Examiner* — Edward Urban
*Assistant Examiner* — Fayyaz Alam
(74) *Attorney, Agent, or Firm* — Maschoff Gilmore & Israelsen (57) ABSTRACT

In a mobile terminal having an automatic startup mode of a television signal receiving function using a timer, startup is properly controlled in consideration of remaining battery capacity to thereby prevent an occurrence of unexpected lack of battery capacity. In a state where an alarm mode using a television broadcast or an FM broadcast has been set, a control unit makes low voltage determination of a battery at a time point when a time has been up. When an output voltage value of the battery is lower than a threshold, the control unit outputs an alarm sound from a speaker instead of starting up a TV receiver and causes a display to display a low voltage message.

10 Claims, 5 Drawing Sheets

FIG. 1

| Mode | Normal mode | Special mode | | | | | |
|---|---|---|---|---|---|---|---|
| | | No vibrator setting | | | Vibrator setting | | |
| | | Silent mode | Alarm mode | Original mode | Silent mode | Alarm mode | Original mode |
| Alarm sound | — | — | — | — | Only vibrator drive (No sound) | Vibrator drives together with sounding occurs in accordance with volume setting at the time of TV automatic startup mode setting | Vibrator drives together with sounding occurs in accordance with volume setting at the time of original mode setting |
| Image | — | — | — | — | Screen indicating that time has been up | Screen indicating that time has been up | Screen indicating that time has been up |
| TV alarm sound | Sounding occurs in accordance with volume setting at the time of TV automatic startup mode setting | No sounding | Sounding occurs in accordance with volume setting at the time of TV automatic startup mode setting | Sounding occurs in accordance with volume setting at the time of original mode setting | No sounding | Sounding occurs in accordance with volume setting at the time of TV automatic startup mode setting | Sounding occurs in accordance with volume setting at the time of original mode setting |
| Image | TV picture | TV picture | TV picture | TV picture | TV picture | TV picture | TV picture |

MOBILE TERMINAL WITH TV AND RADIO AND POWER CONSERVATION

CROSS-REFERENCE TO RELATED APPLICATIONS

This application is based upon and claims the benefit of priority from prior Japanese Patent Application No. 2006-113647, filed Apr. 17, 2006, the entire contents of which are incorporated herein by reference.

BACKGROUND OF THE INVENTION

1. Field of the Invention

The present invention relates to a mobile terminal, and in particular, to a mobile terminal having a function of receiving a television signal or a radio signal.

2. Description of the Related Art

In recent years, in a mobile terminal such as a cellular phone or a personal digital assistant (PDA), there has been introduced a terminal including an additional wireless interface as well as an essential wireless interface for mobile communication. Example of the additional wireless interface includes a wireless local area network (WLAN) and Bluetooth (registered trademark). Further, a terminal having a function of receiving a television signal or a radio signal is also commercially available.

In general, a mobile terminal having a television signal receiving function starts up the television signal receiving function by a user's manual operation to display and output a picture and sound. As an invention having improved this mobile terminal, there has been proposed a terminal having a function of, when a start time of a television program that a user desired to view is set by a timer and the start time has been reached, automatically starting up the television signal receiving function (for example, refer to Jpn. Pat. Appln. KOKAI Publication No. 2005-94273). The mobile terminal having the function can reliably receive the desired program while reducing wasteful power consumption caused by a trial-and-error-like channel selecting operation.

However, such a conventional mobile terminal automatically starts up the television signal receiving function at a time point when the receiving start time of the program set by the timer has been reached even if remaining battery capacity is lowered. In general, the television signal receiving function is large in power consumption quantity as compared with a mobile communication function or the like. For this reason, there can happen to a failure that remaining battery capacity is suddenly exhausted after automatic startup of the television signal receiving function, and the essential mobile communication function cannot be used.

BRIEF SUMMARY OF THE INVENTION

It is an object of the present invention to provide a mobile terminal including an automatic startup mode of a function of receiving a television signal or a radio signal using a timer, the mobile terminal making proper startup control considering the battery residue, thereby preventing an unexpected occurrence of battery shortage.

In order to achieve the above object, according to a first aspect of the present invention, there is provided a mobile terminal comprising: a battery configured to supply a power voltage to the mobile terminal; a receiver unit configured to receive a television signal including video and voice signals; an output unit configured to output the video and voice signals; a setting unit configured to set an operating mode for automatically starting up the receiver unit and the output unit at a desired date and time; a determining unit configured to detect an output voltage of the battery at the desired date and time, and determine whether the detected voltage is higher than a predetermined threshold, or is lower than the threshold; and a control unit configured to restrict operations of the receiver unit and the output unit, if it is determined that the output voltage of the battery is lower than the threshold.

According to a second aspect of the present invention, there is provided a mobile terminal comprising: a battery configured to supply a power voltage to the mobile terminal; a receiver unit configured to receive a radio signal including a voice signal; an output unit configured to output the voice signal; a setting unit configured to set an operating mode for automatically starting up the receiver unit and the output unit at a desired date and time; a determining unit configured to detect an output voltage of the battery at the desired date and time, and determine whether the detected voltage is higher than a predetermined threshold, or is lower than the threshold; and a control unit configured to restrict operations of the receiver unit and the output unit, if it is determined that the output voltage of the battery is lower than the threshold.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Now, an embodiment of the present invention will be described with reference to the accompanying drawings.

Figure 1:
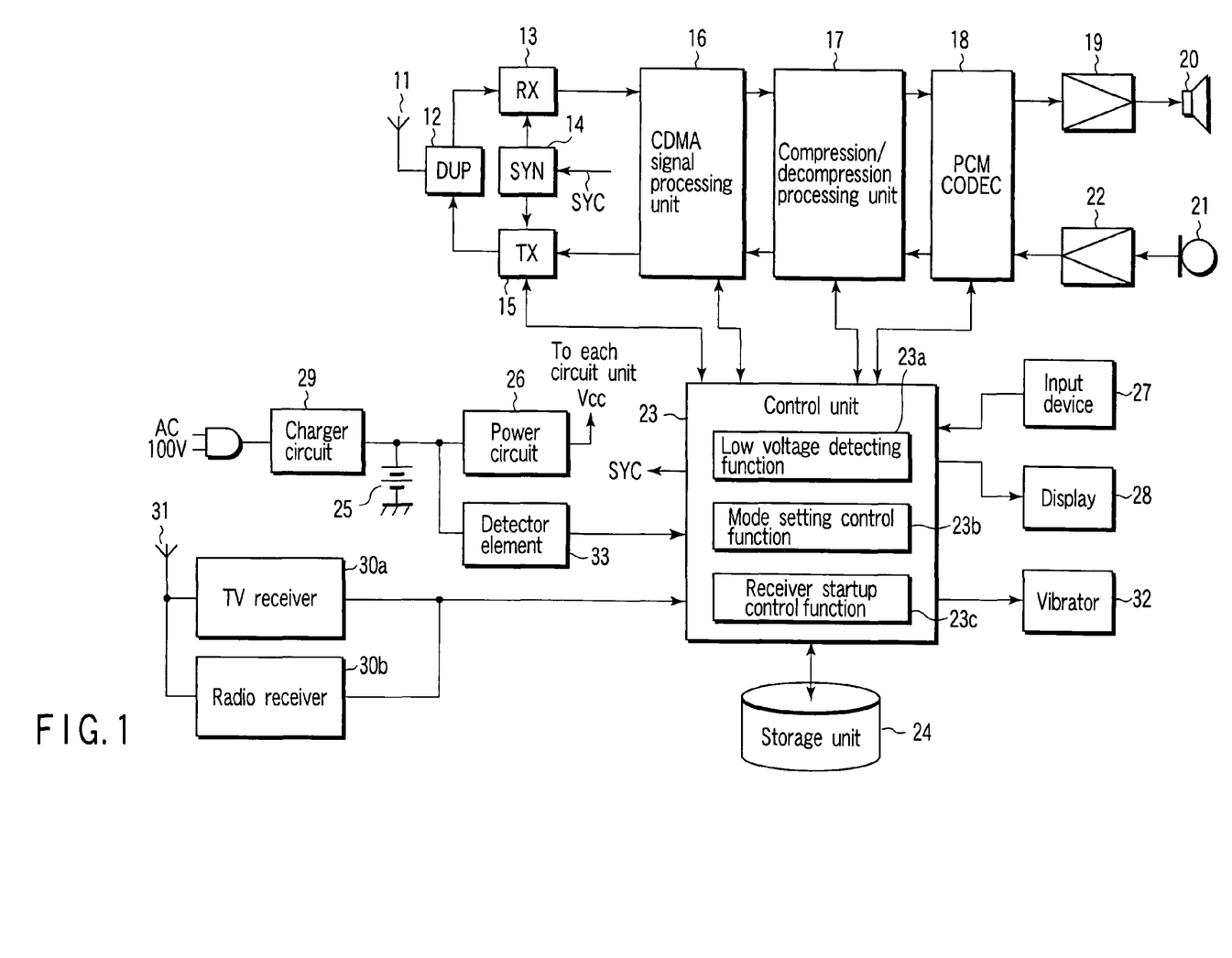
FIG. 1 is a block diagram depicting a mobile terminal according to an embodiment of the present invention.

In FIG. 1, a radio signal transmitted from a base station (not shown) is received by an antenna 11. The received signal is input to a receiver circuit (RX) 13 via an antenna duplexer (DUP) 12. The receiver circuit 13 mixes the received radio signal with a local oscillation signal output from a frequency synthesizer (SYN) 14, and then, frequency-converts (down-converts) the mix into an intermediate frequency signal. Then, the receiver circuit 13 quadrature-demodulates the thus down-converted intermediate frequency signal to output a received baseband signal. A frequency of the local oscillation signal generated from the frequency synthesizer 14 is instructed by a control signal SYC output from a control unit 23.

The received baseband signal is input to a CDMA signal processing unit 16. The CDMA signal processing unit 16 includes a RAKE receiver. In the RAKE receiver, a plurality of passes included in the received baseband signal each are processed to be despread by means of a spread code. Then, the signals of passes processed to be despread are combined with each other after a phase has been adjusted. In this manner, received packet data in a predetermined transmission format can be obtained. The received packet data is input to a compression/decompression processing unit 17 (hereinafter, referred to as a "compander").

The compander 17 demultiplexes the received packet data output from the CDMA signal processing unit 16 in a demultiplexer unit on a medium by medium basis. Then, the compander 17 decodes data for each of the demultiplexed media. For example, in a speech mode, the compander 17 decodes audio data such as voice included in the received packet data by means of a speech CODEC. If video data is included in the received packet data as in a television phone call mode, the compander 17 decodes the video data by means of a video CODEC.

A digital audio signal obtained by means of the decoding in the compander 17 is supplied to a PCM encoding unit (hereinafter, referred to as a PCM CODEC) 18. The PCM CODEC 18 PCM-decodes the digital audio signal output from the compander 17, and outputs an analog audio signal. The analog audio signal is amplified by a received-speech amplifier 19 to be output by a speaker 20.

In the case where an audio playback mode has been set, the control unit 23 reads out the corresponding audio contents from a storage unit 24. The audio contents are decoded, and then, the decoded audio contents are amplified and output from the speaker 20 via the PCM CODEC 18 and the received-speech amplifier 19.

A digital video signal decoded by the compander 17 is input to the control unit 23. The control unit 23 displays the digital video signal output from the compander 17 on a display 28 via a video RAM. Note that the control unit 23 also displays on the display 28 via the video RAM the video data captured as an image by means of a camera (not shown) as well as the received video data.

In the case where a received packet is an e-mail, the compander 17 supplies the e-mail to the control unit 23. The control unit 23 causes the storage unit 24 to store the above e-mail. Then, the control unit 23 reads out the e-mail from the storage unit 24 in response to a display operation made by a user in an input device 27, and then, displays the e-mail on the display 28.

On the other hand, in a speech mode, a speaker's voice signal input to a microphone 21 is amplified up to a proper level by a transmitted-speech amplifier 22. Thereafter, the voice signal is subjected to PCM encoding by the PCM CODEC 18 to becomes a digital audio signal, and the resulting signal is input to the compander 17. In addition, a video signal output from a camera (not shown) is digitized by the control unit 23 to be input to the compander 17. Meanwhile, the e-mail produced at the control unit 23 is also input from the control unit 23 to the compander 17.

The compander 17 detects an energy quantity of an input voice from the digital audio signal output from the PCM CODEC 18, and determines a transmission data rate on the basis of a result of the detection. Then, the compander 17 encodes the digital audio signal to a signal conforming to a format according to the transmission data rate, thereby generating audio data. In addition, the compander 17 encodes the digital video signal output from the control unit 23 to generate video data. The compander 17 produces these audio data and video data as a packet in accordance with a predetermined transmission format at the demultiplexer unit, and outputs the transmission packet data to the CDMA signal processing unit 16. Even in the case where an e-mail has been output from the control unit 23, the compander 17 multiplexes the e-mail with respect to the transmission packet data.

The CDMA signal processing unit 16 applies spread spectrum processing to the transmission packet data output from the compander 17 by using spread codes allocated to a transmission channel. Then, the CDMA signal processing unit 16 outputs the resulting output signal to a transmitter circuit (TX) 15. The transmitter circuit 15 modulates the above spectrum spread signal by using a digital modulation system such as a quadrature phase shift keying (QPSK) system. The transmitter circuit 15 mixes a transmission signal generated by this modulation with a local oscillation signal generated from the frequency synthesizer 14, and frequency-converts the mixed signal into a radio signal. Then, the transmitter circuit 15 amplifies up to a high frequency the radio signal such that the radio signal is obtained at a transmission power level instructed by the control unit 23. The thus amplified radio signal is supplied to the antenna 11 via the antenna duplexer 12, and the supplied signal is transmitted from the antenna 11 to a base station (not shown).

In addition, a mobile cellular phone in the present embodiment includes a television receiver (TV receiver) 30*a*. The TV receiver 30*a* receives, for example, a terrestrial television broadcast signal via an antenna 31. The TV receiver 30*a* demodulates the received television broadcast signal, and converts the demodulated signal to a digital video signal and a digital voice signal. The digital video signal is displayed on the display 28 by the control unit 23. The digital voice signal is supplied from the control unit 23 to the PCM CODEX 18 to be converted into an analog voice signal by the PCM CODEC 18. Thereafter, the analog voice signal is output from the speaker 20 via the received-speech amplifier 19.

Further, the TV receiver 30*a* also has a function of receiving an FM broadcast signal. The TV receiver 30*a* demodulates a received FM broadcast signal to output a digital audio signal. The digital audio signal is supplied from the control unit 23 to the PCM CODEC 18 like the digital audio signal demodulated from the television broadcast signal. Next, the digital audio signal is converted into an analog audio signal by the PCM CODEC 18, and then, the converted signal is output from the speaker 20 via the received-speech amplifier 19. In the case where an earphone has been connected to an earphone terminal (not shown), the voice signal output from the PCM CODEC 18 is output from this earphone instead of the speaker 20.

A power supply circuit 26 generates a predetermined operating power voltage Vcc on the basis of an output of a battery 25, and supplies the generated voltage to each circuit unit. The battery 25 is charged by a charger circuit 29.

In the meantime, the control unit 23 includes, for example, a microcomputer (central processing unit [CPU]). As control functions according to the present invention, the control unit 23 has a low voltage detecting function 23*a*, a mode setting control function 23*b*, and a receiver startup control function 23*c*. These functions are achieved by causing the microcomputer to execute programs.

The low voltage detecting function 23*a* detects an output voltage value of the battery 25 via a detector element 33. Thereafter, the low voltage detecting function 23*a* compares the detected output voltage value with a preset threshold. Then, the low voltage detecting function 23a determines whether the output voltage value of the battery 25 is the threshold or higher, or is lower than the threshold. The threshold is preset to 3.65 V or the like, for example.

Figure 2:
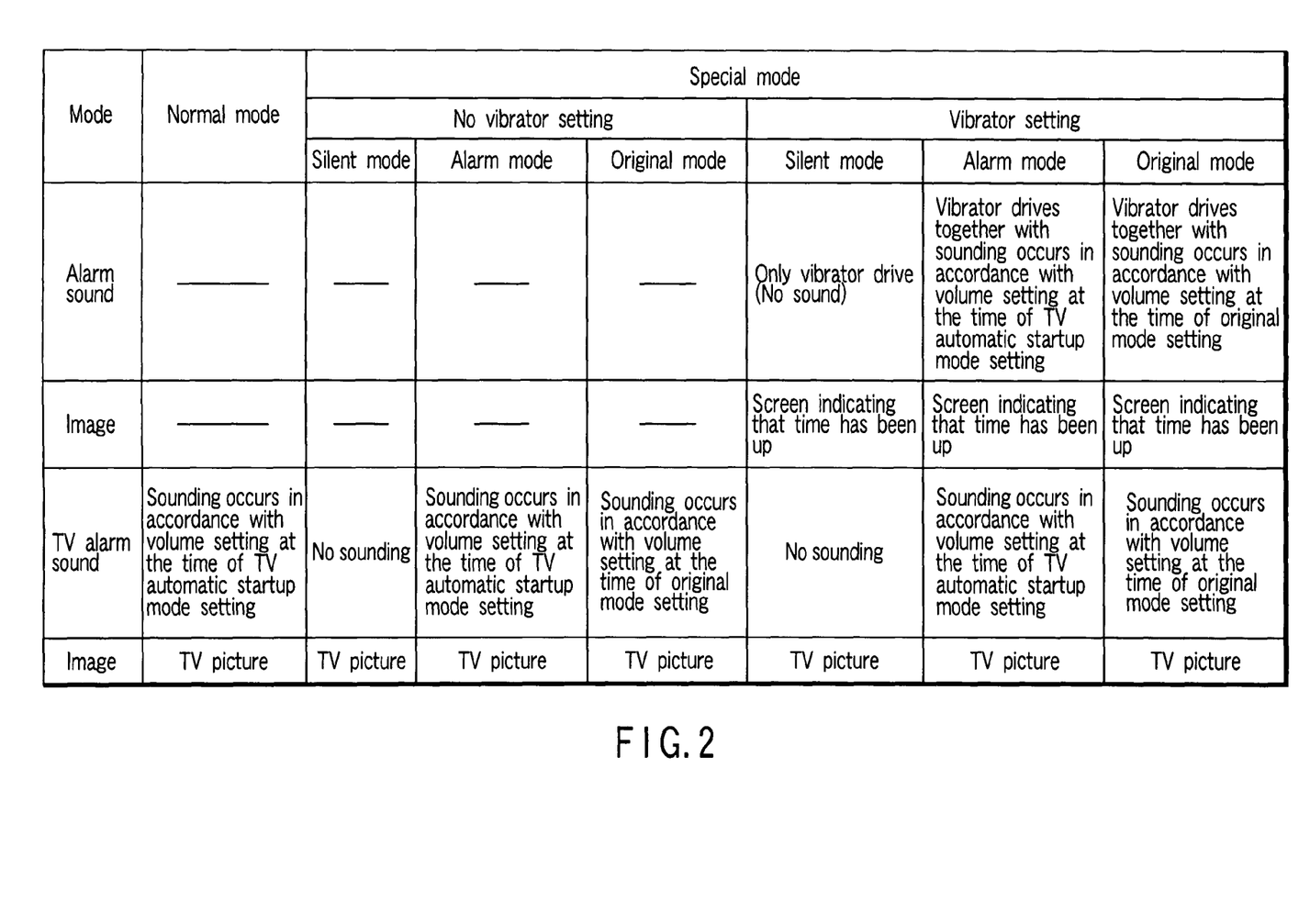
FIG. 2 is a table showing the set contents of a TV automatic startup mode in the mobile terminal shown in FIG. 1.

The mode setting control function 23b sets a user's desired operating mode from among a plurality of operating modes prepared in advance in response to the user's mode setting operation in the input device 27. Although there are a number of operating modes of a mobile terminal in general, the mobile terminal of the present embodiment includes a TV automatic startup mode of a television receiving function using a timer. The TV automatic startup mode can provide further detailed settings as shown below. FIG. 2 shows an example of the setting mode.

Referring to FIG. 2, the TV automatic startup modes include a normal mode and a special mode. Among them, in the normal mode, the control unit 23 displays a TV picture on the display 28, and outputs a TV voice from the speaker 20 in accordance with a preset alarm volume.

On the other hand, the special mode further includes a mode for using a vibrator 32 and a mode for using no vibrator 32. The mode for using no vibrator 32 includes a silent mode, an alarm mode, and an original mode. In the silent mode, the control unit 23 does not output a sound such as a melody as well as a TV voice, and makes only an operation of displaying a TV picture. In the alarm mode, like the above normal mode, the control unit 23 displays a TV picture and outputs a TV voice in accordance with a preset volume by a user at the time of setting a TV automatic startup mode. In the original mode, the control unit 23 displays a TV picture and adjusts a TV voice to a volume separately set by the user at the time of setting the original mode, and then, outputs the adjusted-volume voice. The original mode is provided as a mode applied commonly and preferentially to all the functions of outputting a voice. Consequently, even if a volume has been separately set in the TV automatic startup mode, the volume set by the user at the time of setting the original mode is preferentially applied.

The mode for using the vibrator 32 also includes a silent mode, an alarm mode, and an original mode, similarly. However, in the mode for using the vibrator 32, the control unit 23 first drives the vibrator 32 in all modes such as the silent mode. In this case, the control unit 23 simultaneously outputs an alarm sound in the alarm mode and the original mode. However, in the silent mode, the control unit 23 does not generate an alarm sound. In addition, in all the modes, the control unit 23 causes the display 28 to display a screen indicating that a time has been up. Video data on the screen indicating that a time has been up is stored in advance in the storage unit 24. Thereafter, the mobile terminal makes an operation similar to that in the mode for using no vibrator 32.

The receiver startup control function 23c monitors that a timer's time has been up in the case where the TV automatic startup mode using a timer has been set by the mode setting control function 23b. A software timer is used as the timer. The receiver startup control function 23c refers to the mode set by the mode setting control function 23b and the result of low voltage detection of the battery 25 by the low voltage detecting function 23a. On the basis of these results, the receiver startup control function 23c controls startup of the TV receiver 30a and an operation of outputting a voice and image.

Figure 3:
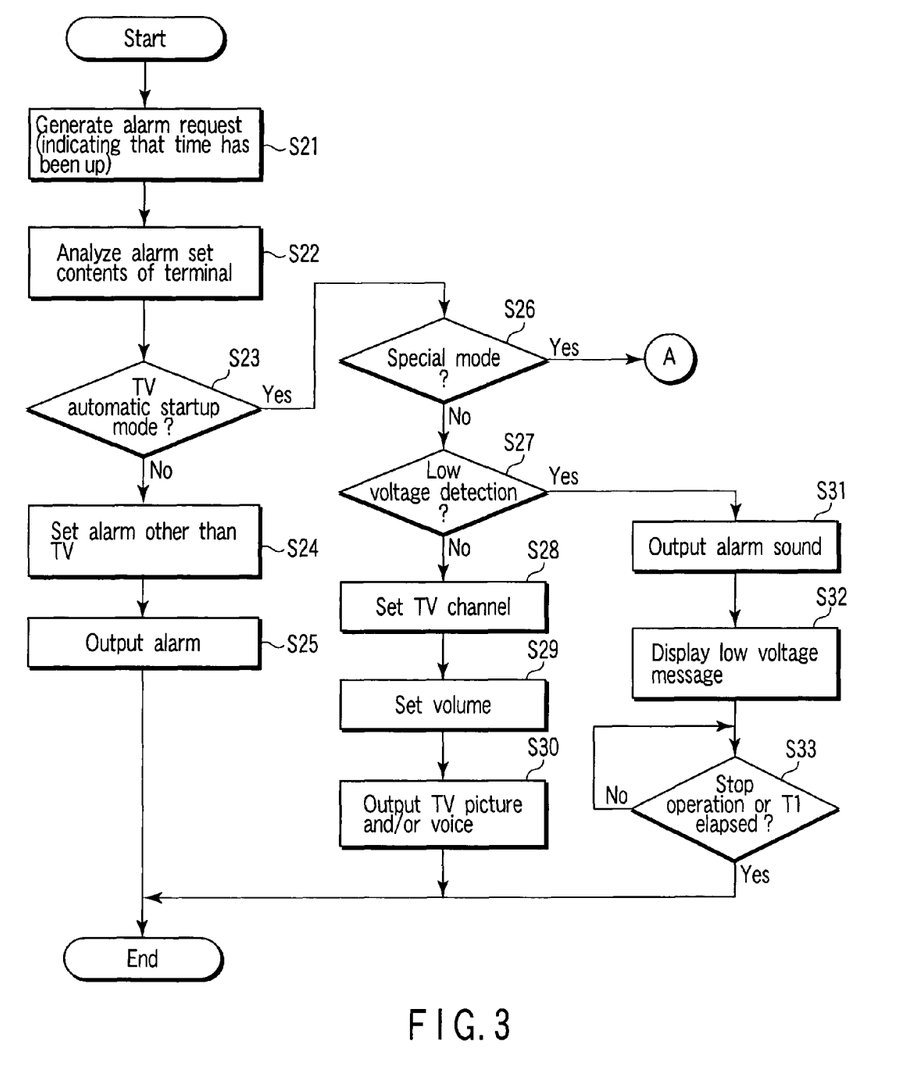
FIG. 3 is a flowchart showing control procedures and control contents by a control unit of the mobile terminal shown in FIG. 1.
Figure 4:
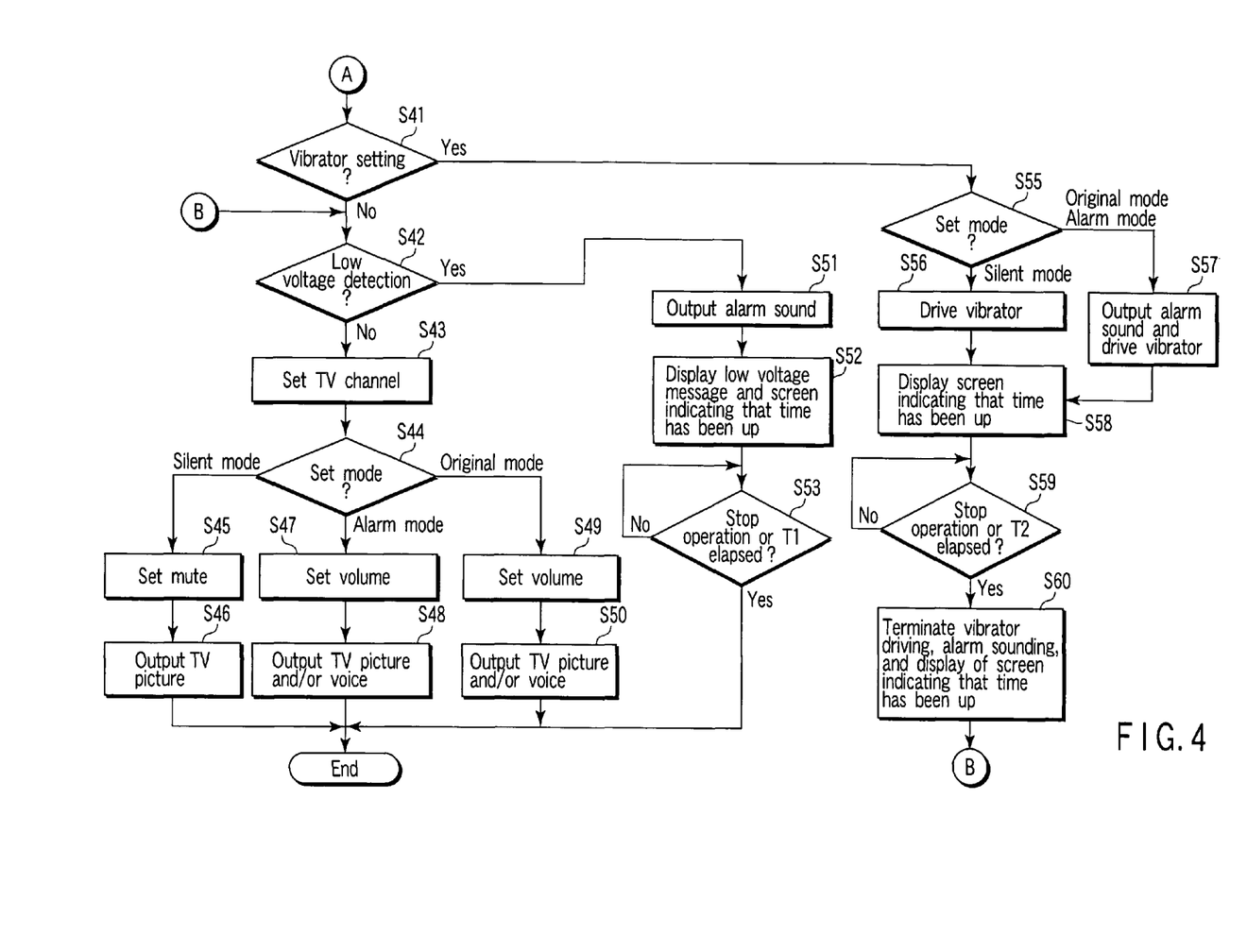
FIG. 4 is a flowchart showing control procedures and control contents by the control unit of the mobile terminal shown in FIG. 1.

Now, a description will be given with respect to an operation of the TV automatic startup mode using a timer. FIGS. 3 and 4 are flow charts showing control procedures and control contents using the control unit 23.

In a state where the TV automatic startup mode using a timer has been set, the control unit 23 monitors whether or not the timer's time has been up. When it is detected that the time has been up, the control unit 23 regards this detection as an alarm request, moves from step S21 to step S22, and first analyzes the contents of alarm setting. Then, the control unit 23 determines in step S23 whether or not an alarm mode for using TV automatic startup is established on the basis of a result of the analysis.

If, as a result of this determination, the determined mode is a mode for using no TV automatic startup, the control unit 23 moves to step S24 in which the control unit 23 sets an operating mode using means other than TV startup according to the set contents. The control unit 23 executes an alarm operation in step S25 in accordance with the set operating mode. In the alarm mode for using no TV automatic startup, for example, a melody or music stored in advance in the storage unit 25 is output from the speaker 20.

On the other hand, assume that, as a result of the determination in the above step S23, an alarm mode being set is a TV automatic startup mode. In this case, the control unit 23 moves to step S26 in which the control unit 23 first determines whether or not a special mode is set. If, as a result of this determination, no special mode is set, the control unit 23 then determines whether an output voltage value of the battery 25 is a threshold or higher, or is lower than the threshold in step S27. If the output voltage of the battery 25 is the threshold or higher, the control unit 23 moves to step S28 in which the control unit 23 sets a channel preset as a receiving target to the TV receiver 30a. Next, in step S29, the control unit 23 sets a TV alarm volume preset by the user at the time of setting the TV automatic startup mode in response to the received-speech amplifier 19. In step S30, the control unit 23 starts up the TV receiver 30a, causes the display 28 to display a picture of the television broadcast signal received by the TV receiver 30a, and outputs a voice signal from the speaker 20 via the received-speech amplifier 19.

In the case where an automatic startup target is FM broadcast instead of TV broadcast, the control unit 23 outputs from the speaker 20 audio of an FM broadcast signal received by the TV receiver 30a. In addition, the control unit 23 causes the display 28 to display a frequency of an FM broadcast channel targeted for receiving.

Figure 6:
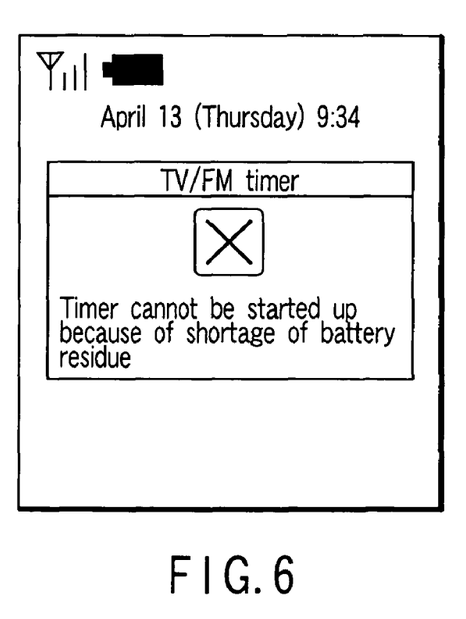
FIG. 6 is a view showing a display example of a low voltage message displayed on the display shown in FIG. 1.

On the other hand, assume that, as a result of low voltage determination in the above step S27, the output voltage value of the battery 25 is lower than the threshold. In this case, the control unit 23 moves to step S31 in which the control unit 23 outputs an alarm sound from the speaker 20 in accordance with a volume preset by the user at the time of setting the TV automatic startup mode. Further, the control unit 23 reads out low voltage message display data from the storage unit 24 in step S32, and causes the display 28 to display this display data. FIG. 6 shows an example of a result of the display. When the above low voltage message is displayed, the control unit 23 sets luminance of backlight of the display 28 to be low as compared with a normal case, namely, a case in which the output voltage value of the battery 25 is the threshold or higher, whereby power consumption of the display 28 itself is also restrained.

When a time T1 preset in this state has elapsed or if the user makes a stop operation before the T1 has elapsed, the control unit 23 terminates the output of the alarm sound and the low voltage message display, and then, moves to a waiting state.

That is, in the case where the output voltage value of the battery 25 is lower than the threshold, the TV receiver 30a is not started up, and instead, an alarm sound is output and a low voltage message is displayed.

Now, an operation in the case where a special mode has been set will be described here. FIG. 4 is a flow chart showing control procedures and control contents using the control unit 23 in the above case.

When it is determined that the special mode has been set in the above step S26, the control unit 23 moves to step S41. In the step S41, the control unit 23 first determines whether or not the mode for using the vibrator 32 has been set. If, as a result of this determination, the mode for using the vibrator 32 has not been set, the control unit 23 moves to step S42. In the step S42, the control unit 23 determines whether the output voltage value of the battery 25 is the threshold or higher, or is lower than the threshold. If the output voltage value of the battery 25 is the threshold or higher, the control unit 23 moves to step S43. In the step S43, the control unit 23 sets a channel preset as a receiving target to the TV receiver 30a, and subsequently, determines the set contents of the special mode in step S44.

If, as a result of this determination, the silent mode has been set, the control unit 23 sets mute with respect to the received-speech amplifier 19 in step S45. Then, the control unit 23 starts up the TV receiver 30a in step S46, and causes the display 28 to display a picture of a television broadcast signal received by the TV receiver 30a. That is, in the case where the silent mode has been set, only display of the TV picture is made.

On the other hand, if the alarm mode has been set, the control unit 23 sets a TV alarm volume preset by the user at the time of setting the TV automatic startup mode to the received-speech amplifier 19 in step S47. Then, in step S48, the control unit 23 starts up the TV receiver 30a, causes the display 28 to display a picture of a television broadcast signal received by the TV receiver 30a, and outputs a voice signal from the speaker 20 via the received-speech amplifier 19.

That is, in the case where the alarm mode has been set, a TV picture is displayed and the TV voice is adjusted to a volume preset by the user at the time of setting the TV automatic startup mode, and then, the adjusted-volume voice is output.

In addition, assume that the original mode has been set. In this case, the control unit 23 sets to the received-speech amplifier 19 a TV alarm volume separately set by the user at the time of setting the original mode in step S49. Then, in step S50, the control unit 23 starts up the TV receiver 30a, causes the display 28 to display a picture of a television broadcast signal received by the TV receiver 30a, and outputs a voice signal from the speaker 20 via the received-speech amplifier 19.

That is, in the case where the original mode has been set, the TV picture is displayed and the TV voice is adjusted to a volume arbitrarily set by the user at the time of setting the original mode, and then, the adjusted-volume voice is output.

Figure 5:
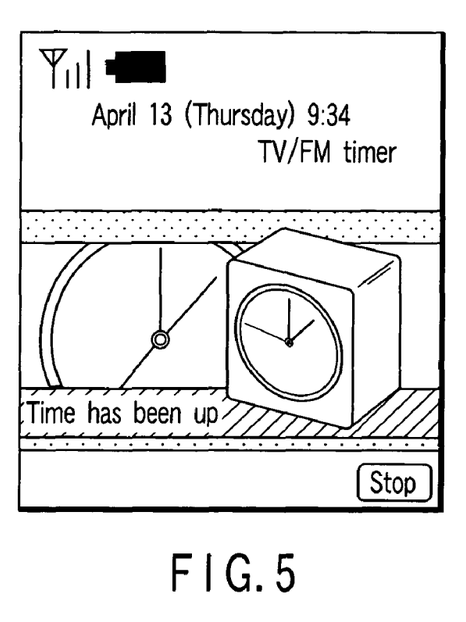
FIG. 5 is a view showing a display example of a screen indicating that a time has been up, the screen being displayed on a display shown in FIG. 1.

In the meantime, assume that, as a result of the low voltage determination in the above step S42, the output voltage value of the battery 25 is lower than the threshold. In this case, in step S51, the control unit 23 outputs an alarm sound adjusted to a volume according to the mode from the speaker 20. Next, the control unit 23 generates a low voltage message and a screen indicating that a time has been up in step S52, and causes the display 28 to display this message. FIGS. 5 and 6 each show an example of a result of the display. If a time T1 preset in this state has elapsed or if the user makes a stop operation before the T1 has elapsed, the control unit 23 terminates the output of the above alarm sound and display of the low voltage message and the screen indicating that a time has been up, and then, moves to a waiting state.

That is, in a special mode for using no vibrator 32 as well, the TV receiver 30a is not started up in the case where the output voltage value of the battery 25 is lower than the threshold. Instead, an alarm sound is output and a low voltage message is displayed.

On the other hand, assume that a special mode for using the vibrator 32 has been set. In this case, the control unit 23 moves to step S55 in which the control unit 23 determines the set contents of the special mode. If, as a result of this determination, the silent mode has been set, the control unit 23 drives the vibrator 32 in step S56.

On the other hand, if the alarm mode and original mode have been set, the control unit 23 drives the vibrator 32 and outputs an alarm sound in step S57. Further, in step S58, the control unit 23 reads out display data on the screen indicating that a time has been up from the storage unit 24, and causes the display 28 to display the display data. The alarm sounds include a melody and music stored in advance in the storage unit 24. When, in step S59, a time T2 preset in this state has elapsed or if the user makes a stop operation before the T2 has elapsed, the control unit 23 moves to step S60. Here, the control unit 23 terminates drive of the vibrator 32, output of the alarm sound, and display of the screen indicating that a time has been up, and then, moves to low voltage determination in step S42.

If, as a result of the low voltage determination, the output voltage value of the battery 25 is the threshold or higher, TV picture display and TV voice output are controlled in accordance with the set conditions of the special mode as described previously, in step S50 moved from step S43. On the other hand, if the output voltage value of the battery 25 is lower than the threshold, the TV receiver 30a is not started up, but an alarm sound is output and a low voltage message is displayed, as described previously, in step S53 moved from step S51.

As has been described above, in the present embodiment, the control unit 23 makes low voltage determination of the battery 25 at a time point when a time has been up, in a state where the automatic startup mode for using a television broadcast or an FM broadcast has been set. In the case where the output voltage value of the battery 25 is lower than the threshold, the control unit 23 does not start up the TV receiver 30a. Instead, the control unit 23 outputs an alarm sound from the speaker 20, and causes the display 28 to display a low voltage message.

Therefore, in the case where the output of the battery 25 is lower than the threshold at a time point when a time has been up, the TV receiver 30a is not started up. Consequently, battery exhaustion is restrained to prevent unpredicted battery shortage from occurring.

The low voltage message is displayed, whereby the user can clearly know a reason why the TV receiver 30a is not started up. Further, when the low voltage message is displayed, the luminance of backlight of the display 28 is set to be lower than that at the time of a normal case. This makes it possible to reduce power consumption of the display 28 itself.

The present invention is not limited to the above-described embodiment. For example, in the foregoing embodiment, the control unit 23 causes the TV receiver 30a not to start up in the case where the output voltage value of the battery 25 is lower than the threshold. Without being limited thereto, the control unit 23 may make control so as to provide only an output of a voice signal without displaying a video signal of a received television broadcast signal, although the control unit 23 causes the TV receiver 30a to start up. By doing this, while power consumption using the TV receiver 30a is not reduced, power consumption required for signal processing and displaying for a video signal in the control unit 23 and power consumption by the display 28 are reduced. Even if a voice output and a video output are provided alternately, similar advantageous effects can be expected while no video output is provided. At the same time, while no voice output is provided, power consumption required for signal processing and outputting for a voice signal and power consumption by the speaker 20 are reduced.

In the foregoing embodiment, the control unit 23 is designed to output an alarm sound and to display a low voltage message in parallel to each other at the same time in the case where the output voltage value of the battery 25 is lower than the threshold. However, the control unit 23 may output an alarm sound and display a low voltage message alternately while these output and display times are differentiated from each other. By doing this, a maximum value of current consumption can be restrained to be low as compared with a case in which an alarm sound output and low voltage message display are made simultaneously. Accordingly, a burden of the battery 25 whose residue has decreased is reduced to the utmost.

Further, in the foregoing embodiment, the control unit 23 causes a low voltage message fixedly provided in advance to be displayed in the case where the output voltage value of the battery 25 is lower than the threshold. However, without being limited thereto, an arbitrary item of video data received in the past by the TV receiver 30*a* is stored in the storage unit 24, so that the control unit 23 may read out the video data and causes the display 28 to display the read-out data. In addition, the control unit 23 may read out the TV voice received in the past from the storage unit 24 so as to be output from the speaker 20 without displaying a picture.

Furthermore, the control unit 23 may provide an access to a Web site by using a mobile communication function, thereby acquiring electronic program guide (EPG) information so as to be stored in the storage unit 24. In such a configuration, in the case where the output voltage value of the battery 25 is lower than the threshold, the control unit 23 selectively reads out information on a program to be received at a time point when a time has been up from the EPG information, and causes the read-out information to be displayed.

Moreover, while the foregoing embodiment has described a case of receiving an analog television broadcast by way of example, the present invention can be applied to one segment of a terrestrial digital broadcast or a case of receiving a satellite mobile broadcast or the like. In addition, while the foregoing embodiment has described a mobile terminal including a television broadcast receiving function by way of example, the present invention can be applied to a mobile terminal having a function of receiving a radio broadcast such as FM broadcast or AM broadcast. The configuration can be achieved by replacing the TV receiver 30*a* in the foregoing embodiment with a radio receiver 30*b*.

With respect to a type or configuration of a mobile terminal, and control procedures and control contents by the control unit 23 as well, various modifications can occur without departing from the spirit of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile terminal comprising: a battery configured to supply a power voltage to the mobile terminal; a receiver unit configured to receive a television signal including video and voice signals; an output unit configured to output the video and voice signals; a setting unit configured to set an operating mode for automatically starting up the receiver unit and the output unit at a desired time; a determining unit configured to detect an output voltage of the battery prior to the starting up of the receiver unit and the output unit, and determine whether the detected output voltage is higher than a predetermined threshold, or is lower than the threshold; and a control unit configured to restrict operations of the receiver unit and the output unit, if it is determined that the output voltage of the battery is lower than the threshold;

wherein the control unit causes the receiver unit and the output unit to operate if it is determined that the output voltage of the battery is higher than the threshold; and wherein in a case where the determining unit determines that the output voltage of the battery is lower than the threshold, the control unit is configured to restrict operations by executing a function of outputting at least one of a video signal and a voice signal stored in advance or a function of displaying a message indicating that the receiver unit cannot be started instead of starting up the receiver unit and the output unit.

2. A mobile terminal comprising: a battery configured to supply a power voltage to the mobile terminal; a receiver unit configured to receive a radio signal including voice signal; an output unit configured to output the voice signal; a setting unit configured to set an operating mode for automatically starting up the receiver unit and the output unit at a desired time; a determining unit configured to detect an output voltage of the battery prior to the starting up of the receiver unit and the output unit, and determine whether the detected output voltage is higher than a predetermined threshold, or is lower than the threshold; and a control unit configured to restrict operations of the receiver unit and the output unit, if it is determined that the output voltage of the battery is lower than the threshold;

wherein the control unit causes the receiver unit and the output unit to operate if it is determined that the output voltage of the battery is higher than the threshold; and wherein in a case where the determining unit determines that the output voltage of the battery is lower than the threshold, the control unit is configured to restrict operations by executing a function of outputting at least one of a video signal and a voice signal stored in advance or a function of displaying a message indicating that the receiver unit cannot be started instead of starting up the receiver unit and the output unit.

3. A mobile terminal according to claim 1, wherein the setting unit is configured to set a vibrator setting mode, in which the control unit drives a vibrator at the desired time, and the determining unit performs the determination of the battery voltage after driving the vibrator.

4. A mobile terminal according to claim 1, further comprising an acquiring unit configured to acquire EPG information, wherein the control unit disables the receiver unit from starting up, and controls the output unit to output the EPG information of a desired television program, if it is determined that the output voltage of the battery is lower than the threshold.

5. A mobile terminal according to claim 1, wherein the setting unit sets either the operating mode or an alarm mode in which the receiver unit and the output unit are not automatically started up at the desired time, and the determining unit skips the determination of the battery voltage if the setting unit has set the alarm mode.

6. A mobile terminal according to claim 2, wherein the setting unit is configured to set a vibrator setting mode, in which the control unit drives a vibrator at the desired time, and the determining unit performs the determination of the battery voltage after driving the vibrator.

7. A mobile terminal according to claim 2, further comprising an acquiring unit configured to acquire EPG information, wherein the control unit disables the receiver unit from starting up, and controls the output unit to output the EPG information of a desired radio program, if it is determined that the output voltage of the battery is lower than the threshold.

8. A mobile terminal according to claim 2, wherein the setting unit sets either the operating mode or an alarm mode in which the receiver unit and the output unit are not automatically started up at the desired time, and the determining unit skips the determination of the battery voltage if the setting unit has set the alarm mode.

9. A mobile terminal comprising: a battery configured to supply a power voltage to the mobile terminal; a receiver unit configured to receive a signal including video and voice signals; an output unit configured to output the video and voice signals; a setting unit configured to set an operating mode for automatically starting up the receiver unit and the output unit at a desired time; a determining unit configured to detect an output voltage of the battery prior to the starting up of the receiver unit and the output unit, and determine whether the detected output voltage is higher than a predetermined threshold, or is lower than the threshold; and a control unit configured to restrict operations of the receiver unit and the output unit, if it is determined that the output voltage of the battery is lower than the threshold;

wherein the control unit causes the receiver unit and the output unit to operate if it is determined that the output voltage of the battery is higher than the threshold; and wherein in a case where the determining unit determines that the output voltage of the battery is lower than the threshold, the control unit is configured to restrict operations by executing a function of outputting at least one of a video signal and a voice signal stored in advance or a function of displaying a message indicating that the receiver unit cannot be started instead of starting up the receiver unit and the output unit.

10. A mobile terminal comprising: a battery configured to supply a power voltage to the mobile terminal; a receiver unit configured to receive a voice signal; an output unit configured to output the voice signal; a setting unit configured to set an operating mode for automatically starting up the receiver unit and the output unit at a desired time; a determining unit configured to detect an output voltage of the battery prior to the starting up of the receiver unit and the output unit, and determine whether the detected output voltage is higher than a predetermined threshold, or is lower than the threshold; and a control unit configured to restrict operations of the receiver unit and the output unit, if it is determined that the output voltage of the battery is lower than the threshold;

wherein the control unit causes the receiver unit and the output unit to operate if it is determined that the output voltage of the battery is higher than the threshold; and wherein in a case where the determining unit determines that the output voltage of the battery is lower than the threshold, the control unit is configured to restrict operations by executing a function of outputting at least one of a video signal and a voice signal stored in advance or a function of displaying a message indicating that the receiver unit cannot be started instead of starting up the receiver unit and the output unit.

* * * * *